United States Patent
Okumura et al.

(10) Patent No.: US 6,863,269 B2
(45) Date of Patent: Mar. 8, 2005

(54) FLUID FILLED VIBRATION DAMPING DEVICE

(75) Inventors: Kei Okumura, Kakamigahara (JP); Hajime Maeno, Kasugai (JP); Koichi Maeda, Nishikamo-gun (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 10/809,837

(22) Filed: Mar. 24, 2004

(65) Prior Publication Data
US 2004/0188900 A1 Sep. 30, 2004

(30) Foreign Application Priority Data
Mar. 26, 2003 (JP) .......................... 2003-084446

(51) Int. Cl.[7] .............................................. F16F 13/00
(52) U.S. Cl. ........................ 267/140.13; 267/141.4; 267/141.5
(58) Field of Search ............................ 248/550, 562, 248/566; 267/140.11, 140.13, 140.14, 140.15, 141.1, 141.4, 141.7; 180/300, 312

(56) References Cited

U.S. PATENT DOCUMENTS

| | | | |
|---|---|---|---|
| 6,032,935 A | | 3/2000 | Mizutani et al. |
| 6,422,546 B1 | | 7/2002 | Nemoto et al. |
| 2002/0101014 A1 | * | 8/2002 | Kurihara et al. ........ 267/140.13 |
| 2002/0140144 A1 | * | 10/2002 | Hibi et al. .............. 267/140.13 |
| 2003/0001322 A1 | * | 1/2003 | Goto et al. ............. 267/140.11 |
| 2003/0038414 A1 | * | 2/2003 | Pizanti et al. .......... 267/140.13 |

FOREIGN PATENT DOCUMENTS

| | | |
|---|---|---|
| JP | 2-119540 | 9/1990 |
| JP | 8-49748 | 2/1996 |
| JP | 9-89040 | 3/1997 |
| JP | 10-54438 | 2/1998 |
| JP | 10-238586 | 9/1998 |
| JP | 2001-1765 | 1/2001 |

* cited by examiner

*Primary Examiner*—Christopher P. Schwartz
(74) *Attorney, Agent, or Firm*—Beyer Weaver & Thomas LLP

(57) ABSTRACT

A fluid filled vibration damping device includes an elastic body connecting a first and a second mounting member to close one opening of the second mounting member, and a lid member is fixed caulkwise to a shoulder of the second mounting member to close the other opening of the second mounting member, thereby providing a fluid chamber filled with a noncomporessible fluid. A partition member of outside diameter smaller than the inside diameter of the cylindrical caulking portion is formed with engaging projections rising up with a uplift cutout form. The engaging projections is fit into the second mounting member with the partition member superimposed on the shoulder so that the second mounting member is positioned in an axis-perpendicular direction to the second mounting member. Cutout openings left after the engaging projections have been formed are closed by a sealing portion.

8 Claims, 3 Drawing Sheets

FLUID FILLED VIBRATION DAMPING DEVICE

INCORPORATED BY REFERENCE

The disclosure of Japanese Patent Application No. 2003-084446 filed on Mar. 26, 2003 including the specification, drawings and abstract is incorporated herein by reference in its entirety.

BACKGROUND OF THE INVENTION

1. Field of the Invention

The present invention relates to a fluid filled vibration damping device affording vibration damping action on the basis of flow and pressure action of a non-compressible fluid sealed therein, and more particularly to a fluid filled vibration damping device of novel construction, suitable for use in an automotive engine mount, body mount or the like, for example.

2. Description of the Related Art

Among vibration damping couplings or mounts for installation between members that make up a vibration transmission system, one type known in the art is a fluid filled vibration damping device having a first mounting member and a second mounting member connected by a rubber elastic body, as well as having a fluid chamber in which is sealed a non-compressible fluid. The device can exhibit damping effect with respect vibration input across the first and second mounting members, by utilizing flow and pressure action of the non-compressible fluid. In such fluid filled vibration damping devices, the fluid chamber is typically partitioned into a number of zones by partition members, to give a design whereby fluid flow action and pressure transmission action among the several zones are utilized to exhibit more enhanced damping effect.

When installing a partition member in order to partition the fluid chamber, it is advantageous to employ a structure that uses the second mounting member of generally cylindrical shape, whose one of axially opposite openings is provided with a fluid-tight closure by the first mounting member elastically connected thereto by means of the rubber elastic body, and whose the other one of axially opposite openings is integrally formed with a shoulder portion and a large-diameter cylindrical caulking portion, and is provided with a fluid-tight closure by the partition member and a lid member whose outside peripheral portions are superimposed on and fixed caulkwise onto the shoulder portion by pressingly bending the cylindrical caulking portion against the shoulder portion in the process of caulking fixation.

In order to rapidly fill the fluid chamber with non-compressible fluid, it is advantageous to employ an arrangement wherein an annular fixing member disposed on the outside peripheral portion of the lid member is secured by press fitting into the cylindrical caulking portion of the second mounting member, while immersed in a mass of a non-compressible fluid so as to provide a fluid-tight closure to the fluid chamber, and then the second mounting member is removed from the non-compressible fluid in order to perform the aforesaid caulking fixation process on the cylindrical caulking portion in the air.

In the conventional fluid filled vibration damping device of this construction, however, the partition member needs to be press fitted into the cylindrical caulking portion and positioned in an axis-perpendicular direction of the second mounting member, as needed in the fixation member, in the process of caulking fixation of the outside peripheral portion of the partition member together with the fixing member to the cylindrical caulking portion of the second mounting member. That is, during assembly, the two members, i.e., the partition member and the fixing member, must be fitted successively into the cylindrical caulking portion while immersed in the mass of the non-compressible fluid, resulting in a laborious operation.

Additionally, where the number of components fixed caulkwise to the second mounting member at the cylindrical caulking portion is increased to two, or three or more, direct superimposition and caulkwise fixing of these components at the cylindrical caulking portion may be undesirable in some instances, due to problems in the caulking operation, such as problems with dimensional accuracy, assuring adequate caulking force, or the like.

In order to position the partition member in the axis-perpendicular direction with respect to the second mounting member, it would be conceivable, for example, to insert the partition member into the interior of the second mounting member so as to fit against an inner circumferential surface of the second mounting member as disclosed in Citation 1. However, the disclosed structure have the substantially entire partition member inserted into the second mounting member inwardly in the axial direction, inevitably decreasing the axial spacing between the partition member and the rubber elastic body, making it difficult to assure adequate capacity of the fluid chamber.

[Citation 1]
JP-U-2-119540

It would also be conceivable to form an annular stepped recess extending in the circumferential direction on the plane of the shoulder portion of the second mounting member, and to position the outside peripheral portion of the partition member (having smaller diameter than the cylindrical caulking portion) fitting against this stepped recess. However, since it is difficult to make the stepped recess very large, this arrangement makes it difficult to determine whether the partition member is positioned within the stepped recess, and to assure adequate reliability. Thus, this is not necessarily an effective approach.

SUMMARY OF THE INVENTION

It is therefore one object of this invention to provide a fluid filled vibration damping device of novel construction, whereby when caulkwise fixing the outer peripheral portion of a partition member for partitioning the fluid chamber, together with an outside peripheral portion of a lid member, the partition member may be positioned readily and precisely in an axis-perpendicular direction of the second mounting member, and whereby assembly process workability is enhanced.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a fluid filled vibration damping device, comprising: (a) a first mounting member;

(b) a second mounting member having a generally hollow cylindrical shape, and situated with a first opening thereof opposed to the first mounting member with an axial spacing therebetween, the second mounting member having a shoulder portion so that a large diameter cylindrical caulking portion is integrally formed at a second opening thereof; (c) a rubber elastic body disposed between the first mounting member and the first opening of the second mounting member, and elastically connecting the first and second mounting members to thereby fluid-tightly close the first opening of the second mounting member; (d) a lid member having an annular fixing member, and fixed by caulking fixation to the second mounting member with the annular fixing member press fit into the cylindrical caulking portion to be superimposed on the shoulder portion, to thereby fluid-tightly close the second opening of the second mounting member; (e) a fluid chamber formed between the rubber elastic body and the lid member, and filled with a noncomporessible fluid; (f) a partition member installed within the fluid chamber, and having an outside diameter smaller than an inside diameter of the cylindrical caulking portion of the second mounting member; (g) a plurality of engaging projections formed onto the partition member by rising up respective portions of an outer peripheral portion of the partition member in uplift cutout form toward one side of the partition member, the engaging projections being fit axially inwardly into the second mounting member with the partition member superimposed on the shoulder portion of the second mounting member so that the engaging projections are held in direct or indirect engagement with an inner circumferential surface of the second mounting member, and that the partition member is positioned in an axis-perpendicular direction with respect to the second mounting member; and (h) a sealing portion disposed to check a flow of the non-compressible fluid through cutout openings left after the engaging projections formed.

The fluid filled vibration damping device of this mode eliminates a need to insert the partition member per se into an interior of the second mounting member in the axial direction, thus assuring a sufficient axial spacing between the partition member and the rubber elastic body. This sufficient axial spacing accordingly makes it possible to form an engaging projection for positioning the partition member in the axis-perpendicular direction with respect to the second mounting member with adequate height, permitting a readily determination of defective positioning of the partition member, so that defective assembly may be avoided. In addition, since the outside diameter dimension of the partition member is smaller than the inside diameter dimension of the cylindrical caulking portion of the second mounting member, the partition member may be easily assembled with the second mounting member, providing an advantage when assembling while immersed in non-compressible fluid.

It should be appreciated that since the engaging projections on the partition member are designed to rise up in uplift cutout form, the engaging projections can be formed with adequate height and adequate size. It should also be appreciated that since there is disposed the sealing portion to seal the cutout openings left after the engaging projections have been formed, a problem of adverse effect on damping performance by the cutout openings may be avoided.

A second mode of the invention is a fluid filled vibration damping device according to the first mode, wherein a periphery of upraised portion of each of the plurality of engaging projections is press punched over a predetermined width. In this mode, the periphery of each engaging projection forming area has been isolated from a surrounding area in advance, by means of press punching. With this arrangement, when each engaging projection is subjected to a press-uplifting process after being press punched, undesirable transmission of stress to the other area in the partition member and a resultant deformation of the partition member can be effectively avoided. Accordingly, even where the partition member is fairly thick, for example, each engaging projection can be consistently produced of adequate size, without causing adverse effects on dimensional accuracy of the partition member.

A third mode of the invention is a fluid filled vibration damping device according to the first or second mode, wherein the sealing portion includes a sealing rubber that is compressed between superimposed faces of the partition member and the fixing member. According to this mode, even if each engaging projection has considerable height and forms a large cutout opening, the sealing portion for sealing the cutout opening can be simply formed by extending the fixing member inwardly in its radial direction beyond the shoulder portion and enough to close cutout openings and/or punch-out holes in the partition member.

A fourth mode of the invention is a fluid filled vibration damping device according to any one of the first through third modes, wherein the lid member includes a readily deformable, flexible rubber layer bonded by vulcanization at an outer peripheral portion thereof to the fixing member, and a pressure-receiving chamber partially defined by the rubber elastic body and adapted to give rise to pressure variation during vibration input is formed on one of axially opposite side of the partition member, while an equilibrium chamber partially defined by the flexible rubber layer and readily allowing change in volume is formed on an other of axially opposite side of the partition member, the pressure-receiving chamber and the equilibrium chamber being held in fluid communication with each other through an fluid passage formed by at least partially utilizing the partition member.

According to this mode, the pressure-receiving chamber and the equilibrium chamber are formed by partitioning the fluid chamber with the partition member, and flow of the fluid through the fluid passage is generated on the basis of relative pressure variation or fluctuations occurring between the chambers during vibration input, thereby exhibiting damping effect through resonance of the fluid.

A fifth mode of the invention is a fluid filled vibration damping device according to any one of the first through third modes, wherein the lid member includes an oscillating plate disposed spaced inwardly from the fixing member, and a supporting rubber plate elastically connecting the oscillating plate to the fixing member, the fluid filled vibration damping device further comprising: an actuator for actuating oscillation of the oscillating plate assembled supported by the second mounting member, thereby forming on one of axially opposite sides of the partition member a pressure-receiving chamber partially defined by the rubber elastic body and adapted to give rise to pressure variation during vibration input, while forming on an other side of the axially opposite sides of the partition member an oscillating chamber that is pressure-controlled by means of oscillation of the oscillation plate, the pressure-receiving chamber and the equilibrium chamber being held in fluid communication with each other through a fluid passage formed by at least partially utilizing the partition member.

According to this mode, the pressure-receiving chamber and the oscillating chamber are formed through partitioning of the fluid chamber by the partition member, and pressure variation in the pressure-controlled oscillating chamber affects the pressure-receiving chamber via the fluid passage. Thus, the fluid filled vibration damping device of this mode can exhibit offsetting and positive damping action against vibration.

A sixth mode of the invention is a fluid filled vibration damping device according to any one of the first through fifth modes, wherein an elastic body outer sleeve of generally cylindrical shape is bonded to the outer peripheral portion of the rubber elastic body through vulcanization of the rubber elastic body, the elastic body outer sleeve is fitting within the second mounting member with positioned in the axis-perpendicular direction of the second mounting member, a flange is disposed at a peripheral portion of an opening at a first axial end of the elastic body outer sleeve, and the flange is superimposed on the shoulder portion of the second mounting member and fixed caulkwise at the cylindrical caulking portion so that an outside peripheral portion of the rubber elastic body is fixed to the second mounting member, while the partition member and the fixing member are serially superimposed against the elastic body outer sleeve with the engaging projection of the partition member positioned indirectly in engagement with the inner circumferential surface of the second mounting member via the elastic body outer sleeve, and with the outside peripheral portion of the partition member supported held between the fixing member and the flange of the elastic body outer sleeve which are respectively caulked directly at the cylindrical caulking portion of the second mounting member.

According to this mode, three components, namely, the elastic body outer sleeve, partition member, and fixing member, can be caulked against the second mounting member. In particular, utilizing the elastic body outer sleeve, the partition member is positioned indirectly in the axis-perpendicular direction with respect to the second mounting member, and utilizing the elastic body outer sleeve and fixing member, the outside peripheral portion of the partition member is fixed caulkwise indirectly to the second mounting member. Thus, the fluid filled vibration damping device of this mode permits effective caulkwise fixing of the three members to the second mounting member.

A seventh mode of the invention is a fluid filled vibration damping device according to the sixth mode, wherein the outside diameter of the partition member is smaller than an inside diameter of the shoulder portion of the second mounting member. According to this mode, the outside peripheral portion of the partition member is positioned at a location away from the caulking location in the second partition member, and the partition member can be fixed caulkwise to the second partition member indirectly via the elastic body outer sleeve member and the fixing member. With this arrangement, the number of components fixed caulkwise directly to the second partition member can be reduced and thickness dimension at the caulking location can be made smaller, as well as facilitating the caulking operation and ensuring dimensional accuracy at the caulking process location.

In the aforesaid sixth or seventh mode of the invention, the previously formed rubber elastic body is attached to the second mounting member by means of the elastic body outer sleeve. If it is employed an arrangement wherein, for example, a rubber elastic body inner member is bonded through the vulcanization to the center portion of the rubber elastic body, and the rubber elastic body is then attached to the first mounting member by means of the elastic body inner member, it is possible to form the diaphragm of the thin rubber film formed as a separate element from the rubber elastic body. More specifically, the diaphragm is formed so as to extend between the first mounting member and the second mounting member, and is bonded to these members through vulcanization of a rubber material of the diaphragm, so as to cover the rubber elastic body. This makes it possible to form a variable-volume equilibrium chamber having non-compressible fluid sealed therein, situated between the rubber elastic body and the diaphragm. As compared, for example, to the case where an equilibrium chamber is formed on the opposite side of the partition member from the pressure-receiving chamber, e.g., the structure according to the aforesaid fourth mode, this mode is able to decrease a dimension of the axial spacing between the first mounting member and the second mounting member, so that a size of the damping device in the axial direction can be made more compact. Alternatively, through combination with the structure according to the aforesaid fifth mode, it is possible to form three chambers, i.e., the pressure-receiving chamber, oscillating chamber, and equilibrium chamber, with excellent space utilization and a simple structure. Where the pressure-receiving chamber and equilibrium chamber are formed at opposite sides of the rubber elastic body, as described hereinabove, an orifice passage interconnecting the pressure-receiving chamber and the equilibrium chamber can be formed effectively at the diametrically superimposed faces of the elastic body outer sleeve and the second mounting member, for example.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein:

FIG. 2A is a top plane view of the partition member when subjected to a press punching operation, and FIG. 2B is a top plane view of the partition member when subjected to press bending operation.

DETAILED DESCRIPTION OF PREFERRED EMBODIMENTS

Figure 1:
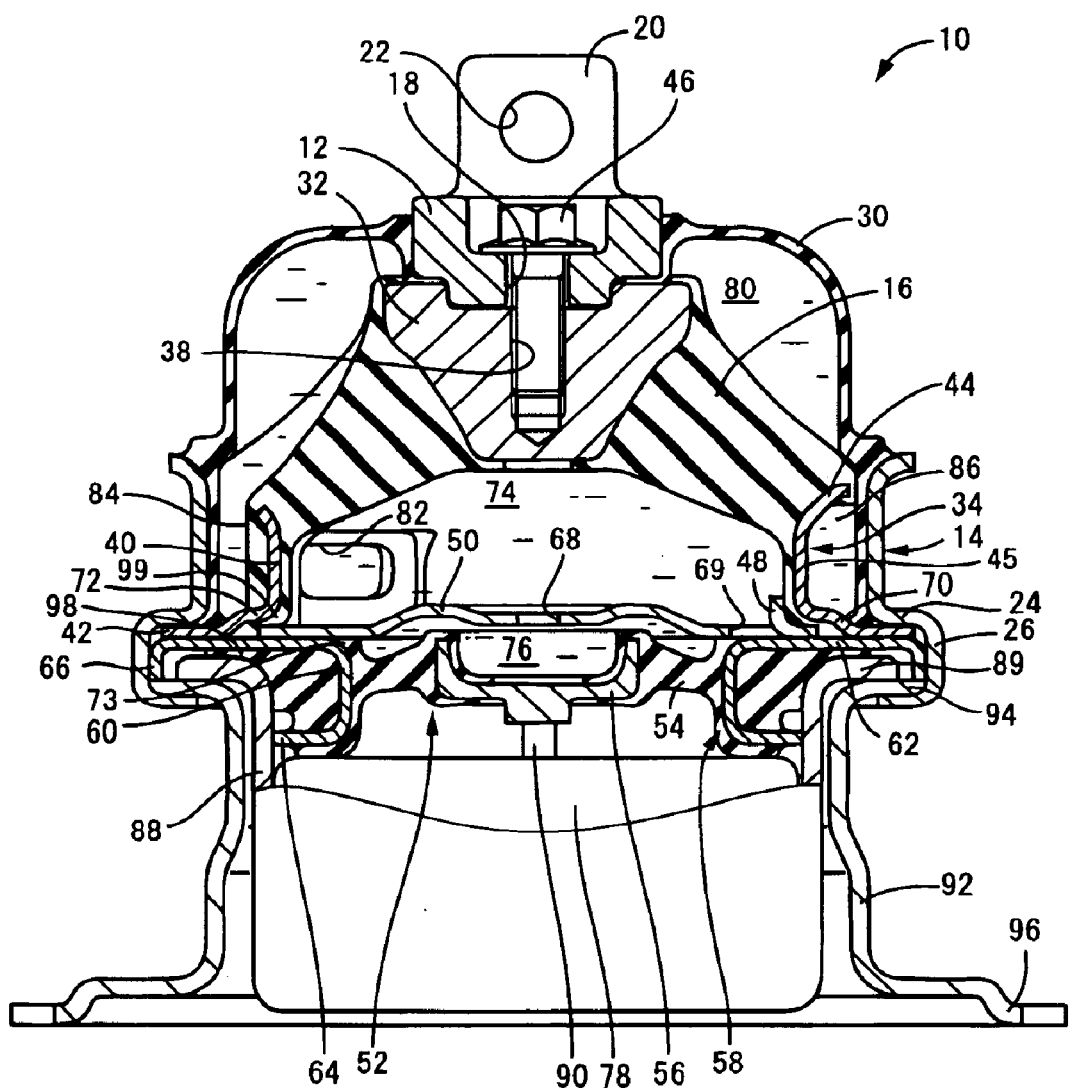
FIG. 1 is an elevational view in axial or vertical cross section of a fluid filled vibration damping device in the form of an automotive engine mount constructed according to one preferred embodiment of the invention.

Referring first to FIG. 1, an engine mount 10 for automotive vehicles is shown as one embodiment of the fluid filled vibration damping device of the present invention. This engine mount 10 includes a first mounting member 12; a second mounting member 14; and a rubber elastic body 16 elastically connecting the first and second mounting members 12, 14 which are both made of metal. The engine mount 10 is installed on the vehicle such that the first mounting member 12 is attached to a power unit of the vehicle (not shown), while the second mounting member 14 is attached to a body of the vehicle (not shown), so that the power unit is mounted on the body in a vibration-damping or isolating manner. With the engine mount 10 installed on the vehicle as described above, both of the weight of the power unit and a primary vibrational load act across the first mounting member 12 and the second mounting member 14 in an approximately axial direction of the engine mount 10 (i.e., the vertical direction as seen in FIG. 1). In the following description, the vertical direction is basically equal to the vertical direction as seen in FIG. 1, that is substantially equal to the vertical direction of the engine mount installed in position.

Described in detail, the first mounting member 12 takes the form of a thick-walled disk. The first mounting member 12 includes a through hole 18 perforated in its central portion, and a fixing plate portion 20 integrally projecting from an upper face thereof. This first mounting member 12 is fixed to the power unit (not shown) by means of a fastening bolt (not shown) passed through a bolt hole 22 bored in fixing plate portion 20.

The second mounting member 14 takes the form of a thin-walled, large-diameter cylinder. The second mounting member 14 includes a shoulder portion 24 integrally formed at a lower axial opening thereof (i.e. a second opening), and an annular cylindrical caulking portion 26 integrally formed at an outside peripheral portion of shoulder portion 24.

The first mounting member 12 is arranged some distance upward in the axial direction away from the second mounting member 14, in a coaxial relationship with the member 14. These first and second mounting members 12, 14 are connected together by means of by means of a flexible rubber layer in the form of a diaphragm 30. The diaphragm 30 is formed of a thin rubber film of generally annular shape, which extends in the circumferential direction with a curve cross section having appreciable slack so as to readily permit elastic deformation. The inside peripheral portion of the diaphragm 30 is bonded to the outside peripheral portion of the first mounting member 12 through vulcanization of a rubber material for forming the diaphragm 30. The outside peripheral portion of the diaphragm 30 is bonded through the vulcanization to the peripheral portion of an opening (i.e. a first opening) situated at the axial upper end of the second mounting member 14. Namely, the diaphragm 30 is formed as an integral vulcanization molded article comprising the first mounting member 12 and the second mounting member 14.

This integral vulcanization molded article is subsequently assembled with a rubber elastic body 16 (which has been separately vulcanization molded) so that the first mounting member 12 and the second mounting member 14 are connected by means of the rubber elastic body 16.

The rubber elastic body 16 has an overall shape of a large-diameter truncated cone. In the center portion of the rubber elastic body 16, an elastic body inner member 32 is concentrically disposed and bonded through vulcanization of a rubber material for forming the elastic body 16. On an outer circumferential surface of the large diameter end portion of the elastic body 16, an elastic body inner outer sleeve 34 is superimposed and bonded through the vulcanization.

The elastic body inner member 32 has an inverted truncated cone shape, with a tapped hole 38 that opens onto the upper face disposed in the generally center portion thereof. On the other hand, the elastic body outer sleeve 34 comprises a cylindrical wall portion 40 having generally large-diameter cylindrical shape, with a flange 42 spreading diametrically outward being integrally formed at the lower axial end of this cylindrical wall portion 40, and with the axial upper end of the cylindrical wall portion 40 constituting a tapered cylindrical portion 44 that gradually flares out as it goes upwards in the axial direction. With this arrangement, a circumferential groove 45 is formed extending about an outer circumferential surface of the elastic body outer sleeve 34 over a distance just shorter than a circumference of the cylindrical wall portion 40, while being open in an outer circumferential surface of the elastic body outer sleeve 34. When bonded through the vulcanization to the rubber elastic body 16, an outer circumferential surface of the inverted taper of the elastic body inner member 32 and the tapered cylindrical portion 44 of the elastic body outer sleeve 34 are positioned spaced apart facing to each other, with the opposing faces of the elastic body inner member 32 and elastic body outer sleeve 34 being elastically connected by means of the rubber elastic body 16. Namely, the rubber elastic body 16 is formed as an integral vulcanization molded article comprising the elastic body inner member 34 and the elastic body outer sleeve 36.

The integral vulcanization molded article of the diaphragm 30 is then assembled with the integral vulcanization molded article of the rubber elastic body 16 by being superimposed thereon from above. With this arrangement, the first mounting member 12 is superposed on the upper face of the elastic body inner member 32 and fixed thereon, and the second mounting member 14 is externally fitted onto the elastic body inner member 34, while the diaphragm 30 disposed some distance outward from the rubber elastic body 16, so as to cover the entire outside face of the rubber elastic body 16.

That is, the first mounting member 12 is superimposed directly on the upper face of the elastic body inner member 32, and these are fastened together by a connecting bolt 46. Projection/recess mating portions are disposed on the superimposed faces of the first mounting member 12 and the elastic body inner member 32, to position them in the axis-perpendicular and circumferential directions. On the other hand, the elastic body outer sleeve 34, meanwhile, is arranged at the lower end thereof such that an outside peripheral portion of the flange 42 is superimposed directly in the axial direction onto the shoulder portion 24, and at the upper end thereof such that the peripheral portion of the opening of the tapered cylindrical portion 44 is superimposed in the diametrical direction onto the inner circumferential surface of the second mounting member 14 over the entire circumference thereof.

The elastic body outer sleeve 34 and the second mounting member 14 are fastened together by being assembled through caulkwise fixation of the cylindrical caulking portion 26 of the second mounting member 14 to the outside peripheral portion of the flange 42 of the elastic body outer sleeve 34. At locations where the upper and lower edges of the elastic body outer sleeve 34 are superimposed against the second mounting member 14, there is interposed a sealing rubber integrally formed with the rubber elastic body 16 or the diaphragm 30, to thereby provide a fluid-tight sealing. By means of this arrangement, the circumferential groove 45 formed about the elastic body outer sleeve 34 is covered in a fluid-tight fashion, by the second mounting member 14. Thus, a passage extending a predetermined distance in the circumferential direction is formed between the diametrically opposed faces of the second mounting member 14 and the cylindrical wall portion 40 of the elastic body outer sleeve 24.

To the lower opening of the elastic body outer sleeve 34 is assembled a partition member composed of the partition member 50 and the lid member 52. The lid member 52 includes a supporting rubber elastic body in the form of a support rubber plate 54; an oscillating plate 56 bonded by vulcanization of a rubber material for forming the support rubber plate 54 to the central portion of the support rubber plate 54; and a circular fixing member 58 bonded by the vulcanization to the outer peripheral portion of the support rubber plate 54. Therefore, the oscillating plate 56 and the fixing member 58 are elastically connected by the supporting rubber plate 54.

The oscillating plate 56 is a disk shaped member made of rigid material such as metal or hard resin, and has a circular peripheral projection integrally formed at the outside edge thereof projecting upwardly. The annular fixing member 59 is a metallic member having a cylindrical shaped tubular portion 60. A fixing plate portion 62 (which extends in a flange configuration), and a positioning projection 64 are integrally formed at the upper and lower openings of the tubular portion 60, respectively. A circular press-fit part 66 is integrally formed at the outside peripheral portion of the fixing plate portion 62 so as to project further downwards.

This oscillating plate 56 is arranged substantially concentrically with and spaced apart diametrically inwardly from the fixing member 58. The supporting rubber plate 54 is arranged so as to extend between the diametrically opposed faces of the fixing member 58 and the oscillating plate 56. The supporting rubber plate 54 is bonded at its inner and outer peripheral portions to the opposing faces of the outer peripheral projection of the oscillating plate 56 and the tubular portion 60 of the fixing member 58, through vulcanization process of a rubber material for forming the supporting rubber plate 54. With this arrangement, a gap formed between the oscillating plate 56 and the fixing member 58 is fluid tightly closed by means of the supporting rubber plate 54.

The partition member 50 is a thin disk metallic member having an outside diameter of size extending as far as the diametric medial portion of the fixing plate portion 62 of the fixing member 58. In this embodiment, the outside diameter of the partition member 50 is smaller, by a predetermined amount, than the inside diameter dimension of the shoulder portion 24 of the second mounting member 14. The center portion of the partition member 50 is a circular zone of size approximately equal to the outside diameter of the oscillation plate 56, projecting upward in a generally plateau-like configuration, so as to avoid contact with the oscillation plate 56. The partition member 50 is perforated through its thickness on its center axis by a fluid passage 68 that serves as a pressure transmission flow passage.

Figure 2A:
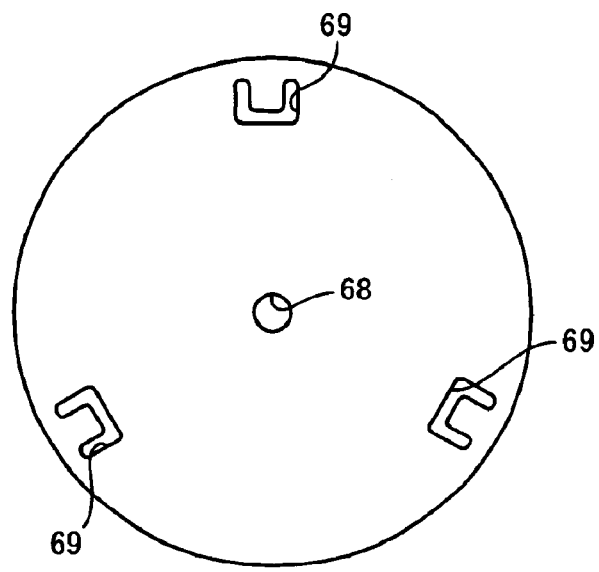
FIGS. 2A and 2B are views suitable for explaining manufacturing processes of a partition member of the engine mount of FIG. 1, where
Figure 2B:
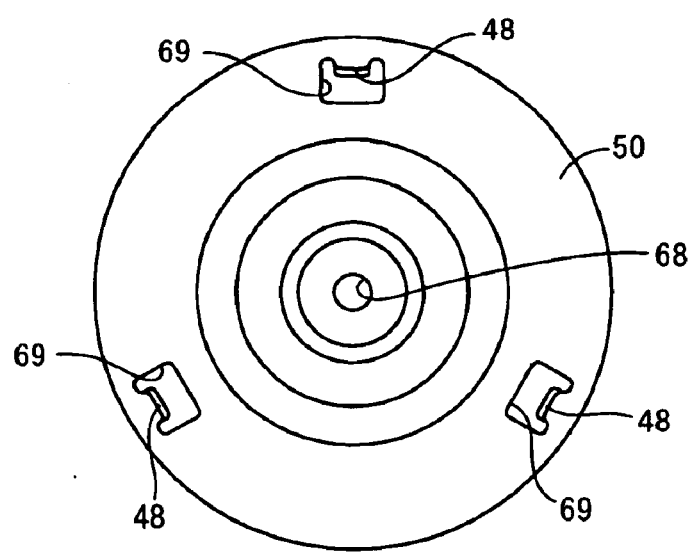

The partition member 50 are also provided with three engaging projections 48 that project upward, situated at respective portions along the circumference in proximity to the outside edge. These engaging projections 48 are integrally formed by subjecting the partition member 50 to press working. In more detail, a disk of flat material is subjected to press punching to form a circular fluid passage 68 in the center, and three generally "C" shaped punch-out holes 69 along the outside edge, as shown in FIG. 2(a). The material is then subjected to press bending in order to form a plateau shape at the center, as well as to bend the tongue-shaped portions surrounded by the punch-out holes 69 upwardly at a substantially right angle, to thereby form a total of three engaging projections 48, as shown in FIG. 2(b). It should be noted that since the punch-out holes 69 are formed prior to raising the engaging projections 48, deformation of the partition member in other areas during raising of the engaging projections 48 can be reduced or avoided, thereby accomplishing an improved dimensional accuracy of the component. A total of three cutout openings are left after the engaging projections have been formed by bending, at a radially inside of the engaging projections 48, as shown in FIG. 2B.

The partition member 50 is assembled in the lower opening of the second mounting member 14, with its outside peripheral portion superimposed against the flange 42 of the elastic body outer sleeve 34 assembled therewith. Additionally, the lid member 52 is assembled in the lower opening of the second mounting member 14 from below the partition member 50, and the fixing plate portion 62 of the fixing member 58 in the lid member 52 is superimposed onto the elastic body outer sleeve 34 and the partition member 50. The thus arranged partition member 50 and the lid member 52 are fixed caulkwise at their outside peripheral portions to the second mounting member 14 by pressingly bending the cylindrical caulking portion 26 of the second mounting member 14 against the outside peripheral portions in the process of caulking fixation.

The partition member 50 has an outside diameter adjusted so as not to reach the shoulder portion 24 of the second mounting member 14. That is, the outside peripheral portion of the partition member 50 is sandwiched in the axial direction between the fixing member 58 (fixing plate portion 62) and the elastic body outer sleeve 34, which are fixed caulkwise directly between the shoulder portion 24 and the cylindrical caulking portion 26. With this arrangement, the partition member 50 is attached fixedly to the second mounting member 14, with the caulking force of the second mounting member 14 exerted indirectly thereon via the elastic body outer sleeve 34 and the fixing member 58.

The three engaging projections 48 integrally formed on partition member 50 fit in the axial direction into the elastic body outer sleeve 34 through the opening, and by being superimposed against the inner circumferential surface of the elastic body outer sleeve 34, whereby the partition member 50 is effectively positioned in the axis-perpendicular direction.

On the flange 42 of the elastic body outer sleeve 34, there is disposed an annular stepped portion 70 that extends in the circumferential direction in the diametrically medial portion of the flange 42. The portion situated radially outward of the stepped portion 70 is superimposed on the shoulder portion 24 of the first mounting member 14, whereas the portion situated radially inward of the stepped portion 70 is deflected upwardly from the fixing plate portion 62, thereby forming an annular gripping part 72. This annular gripping part 72 cooperates with the fixing plate portion 62 to grip therebetween the outside peripheral portion of the partition member 50 inserted into the spacing therebetween. Thus, the partition member 50 is held fixed in the axial direction.

That is, the partition member 50 is neither positioned nor fixed directly with respect to the second mounting member 14, but is rather positioned and fixed indirectly with respect to the second mounting member 14 via the elastic body outer sleeve 34, which is positioned directly and fixed caulkwise to the second mounting member 14. At the bottom face of the partition member 50, the fixing plate portion 62 of the fixing member 52 extends diametrically inward beyond the elastic body outer sleeve 34, and is superimposed against the bottom face of the partition member 50. The inside peripheral portion of the fixing plate portion 62 is positioned radially inward of the punch-out holes 69 of the partition member 50, where a sealing rubber layer 73, integrally formed with the supporting rubber plate 54 and bonded by vulcanization to the fixing plate portion 62, is held sandwiched between the fixing plate portion 62 and the partition member 50. By means of this arrangement, the punch-put holes 69 and the cutout openings for the engaging projections 48 in partition member 50 may be provided with substantially liquid-tight closure. As is understood from the above description, a sealing portion in this embodiment is constituted by a sealing rubber layer 73 and the fixing plate portion of the fixing member 58.

With the arrangement as discussed above, the opening at the lower end of the second mounting member 14 is closed in a fluid-tight fashion by the lid member 52, and a pressure-receiving chamber 74 having a non-compressible fluid sealed therein and partially defined by the rubber elastic body 16, is formed on the upper side of the partition member 50, which extends in the axis-perpendicular direction fixedly supported by the second mounting member 14. This pressure-receiving chamber 74 is designed to excite fluid pressure variation based on elastic deformation of the rubber elastic body 16 when vibration is input across the first mounting member 12 and second mounting member 14. On the other side of the partition member 50, i.e. opposite from the pressure-receiving chamber 74, there is formed an oscillating chamber 76 having a non-compressible fluid sealed therein and partially defined by the oscillation plate 56. This oscillating chamber 76 is designed to be positively controlled in its fluid pressure variations, in response to oscillatory actuation of the oscillation plate 56 by an actuator 78 (which will be described later).

The pressure-receiving chamber 74 and the oscillating chamber 76 formed above and below the partition member 50 are held in fluid communication with each other through a fluid passage 68 formed in the center of the partition member 50. Therefore, pressure variations produced in the oscillating chamber 76 by oscillation of the oscillation plate 56 are transmitted via the fluid passage 68 to pressure-receiving chamber 74, whereby pressure in the pressure-receiving chamber 74 can be positively or actively controlled.

Furthermore, the rubber elastic body 16 and the diaphragm 30 are each directly bonded or attached at their inside peripheral portion and outside peripheral portion to the first mounting member 12 and the second mounting member 14, thereby forming an equilibrium chamber 80 having a non-compressible fluid sealed therein, between the opposing faces of the rubber elastic body 16 and the diaphragm 30. This equilibrium chamber 80 is partially defined by the readily deformable diaphragm 30, and is designed to readily allow change in volume, based on elastic deformation of the diaphragm 30.

Additionally, a circumferential passage formed between the second mounting member 14 and the elastic body outer sleeve 34 connects at both circumferential ends thereof with the pressure-receiving chamber 74 and equilibrium chamber 80 via communication holes 82, 84. This arrangement provides a fluid communication between the pressure-receiving chamber 74 and equilibrium chamber 80, and forms over a predetermined distance an orifice passage 86 that permits flow of fluid between the two chambers 74, 80. The orifice passage 86 is tuned by suitably adjusting the passage cross sectional area and the passage length so that the engine mount 10 can exhibit damping effect with respect to a specific frequency range of input vibration, e.g., a low frequency range of engine shakes, based on resonance of fluid flows through the orifice passage 86 due to a pressure differential between the pressure-receiving chamber 74 and equilibrium chamber 80.

As the non-compressible fluid sealed within the pressure-receiving chamber 74, oscillating chamber 76 and equilibrium chamber 80, it is typically favorable to employ a fluid having a low viscosity of not larger than 0.1 Pa. s, for example, in order to efficiently achieve effective damping action based on resonance of fluid induced to flow among the chambers 74, 76, 80.

The aforesaid actuator 78 is disposed on the opposite side of the lid member 52 remote from the pressure-receiving chamber 74. As the actuator 78, there may be employed any suitable component known in the art, with the proviso that it be able to generate unidirectional oscillating force, and have controllable oscillating force frequency and phase. Besides the electromagnetic actuators disclosed JP-A-9-89040 and JP2001-1765, for example, there could be employed the pneumatic actuator disclosed in JP-A-10-238586, for example, or other similar device. This kind of actuator 78 comprises a generally cup-shaped housing 88, with a flange 89 formed on the rim of the housing 88, which is fixed caulkwise held between the shoulder portion 24 of the second mounting member 14 and the cylindrical caulking portion 26, to assemble the actuator 78 to the second mounting member 14.

An output shaft 90 of the actuator 78 projects axially upward and is fixed to the oscillation plate 56, so that oscillation force in the axial direction by the output shaft 90 of actuator 78 is exerted on the oscillation plate 56, causing the oscillation plate 56 to reciprocate in the axial direction.

A cylindrical bracket 92 is attached to the actuator 78, fitted about the exterior thereof. This cylindrical bracket 92 has a flange 94 formed at the upper end opening and a fixing plate portion 96 formed at the lower end opening. The flange 94, together with the flange 89 of the actuator 78, is fixed caulkwise held between the shoulder portion 24 of the second mounting member 14 and the cylindrical caulking portion 26. A plurality of mounting holes (not shown) are formed in the fixing plate portion 96, and the cylindrical bracket 92 is fastened to the body of the vehicle (not shown) by means of fastening bolts passed through these mounting holes.

In the present embodiment, the cylindrical bracket 92 is securely fastened to the second mounting member 14 by means of superimposing the flange 94 thereof directly against the elastic body outer sleeve 34 and fixing member 58 with the metals thereof abutting, and fastening caulkwise the shoulder portion 24 of the second mounting member 14 and the cylindrical caulking portion 26, while the cylindrical bracket 92 as well as the second mounting member 14 constitutes a transmission path for load and vibration. On the other hand, the housing 88 of the actuator 78 is arranged with the flange 89 thereof forcedly gripped by and held between the fixing member 58 and the flange 94 of the cylindrical bracket 92 in the axial direction via a gripped rubber layer 98 bonded to the fixing member 58. By means of this arrangement, the extent of the dimensional error of the flange 89 of the housing 88 can be absorbed through elastic deformation of the gripped rubber layer 98, thus avoiding adverse effects of the cylindrical caulking portion 26 on the accuracy of caulking.

As described hereinabove, the engine mount 10 constructed according to the embodiment is installed between the power unit and the vehicle body, with the first mounting member 12 mounted on the power unit, and with the second mounting member 14 mounted on the vehicle body. With such an installation, when vibration is input across the first mounting member 12 and the second mounting member 14, fluid pressure variation is created between the pressure-receiving chamber 74 and the equilibrium chamber 80, due to elastic deformation of the rubber elastic body 16, thereby causing forced flows of the fluid through the orifice passage 86 between the pressure receiving chamber 74 and the equilibrium chamber. Therefore, the engine mount 10 can exhibit excellent passive damping effect with the help of resonance or flows of the fluid through the orifice passage. Additionally, through actuation control of the actuator 78 at a frequency and a phase depending on the vibration being damped, the oscillation plate 56 is actively oscillated in order to induce intended fluid pressure variation in the pressure-receiving chamber, whereby the engine mount 10 can exhibit excellent active damping action against input vibration. In particular, this active damping effect is advantageously achieved even against medium- to high-frequency vibrations, which are difficult to damp through passive damping based on flow of the fluid through the orifice passage 86.

In the engine mount 10 of this embodiment, components fixed caulkwise directly to the second mounting member 14 are the elastic body outer sleeve 34, the fixing member 58, and the cylindrical bracket 92. These components are fixed caulkwise securely at a caulking site produced by the shoulder portion 24 and cylindrical caulking portion 26, with the metals thereof substantially abutting in the axial direction. On the other hand, the partition member 50 is situated away from the shoulder portion 24 inwardly in the diametrical direction, and is fixed held between the elastic body outer sleeve 34 and the fitting member 58, such that caulkwise fixing force is simply exerted as fixing force indirectly via the elastic body outer sleeve 34 and the fitting member 58.

That is, by situating the partition member 50 substantially away from the caulkwise fixing site of the second mounting member 14, the number of components needed for caulkwise fixing is reduced to a corresponding extent, thereby providing an advantage in terms of dimensional accuracy of the caulking site. This arrangement makes it possible to carry out consistent caulkwise fixing, while making it possible to achieve a high degree of fastening strength for the elastic body outer sleeve 34, the fixing member 58, and the cylindrical bracket 92 in particular, for which components is needed a high degree of fastening strength to the second mounting member 14.

The partition member 50 is also positioned with high accuracy in the axis-perpendicular direction, by means of the integrally formed plurality of engaging projections 48 fitting into the elastic body outer sleeve 34. In particular, as the engaging projections 48 can be formed with adequate height dimension, positioning defects of the partition member can be ascertained readily, making it possible to effectively prevent the occurrence of defective products due to caulkwise fixing with the partition member 50 out of proper position. That is, the engine mount 10 of the present embodiment may be advantageously manufactured, for example, by assembling together the partition member 50 and the second mounting member 14 of the vulcanization molded article of the diaphragm 30 (which is assembled in advance with the vulcanization molded article of the rubber elastic body 16), while immersed in a mass of non-compressible fluid, and press fitting/fixing the fixing member 58 into the cylindrical caulking portion 26, to form the pressure-receiving chamber 74, the equilibrium chamber 80, and the oscillating chamber 76, while at the same time sealing the non-compressible fluid therein. Then, the assembly is removed from the mass of the non-compressible fluid, and is assembled with the actuator 78 and the cylindrical bracket 92 under the air, thereby providing the engine mount 10 of the present embodiment. This facilitates process of positioning of the partition member and asertaining the same, although these steps are carried out under non-compressible fluid.

In the present embodiment, in particular, since the partition member 50 is gripped by and between the flange 42 and the fixing plate portion 62 of the fixing member, via a sealing rubber layer 99 bonded by vulcanization to the flange 42 of the elastic body outer sleeve 34, adverse effects of dimensional error of the partition member 50 on caulking accuracy at the caulking site can be avoided as much as possible, affording more consistent caulkwise fixing.

Moreover, since the equilibrium chamber 80 which connects with the pressure-receiving chamber 74 via the orifice passage 86 has an annular configuration situated to the outside of the rubber elastic body 16, the equilibrium chamber 80 can be formed while avoiding as much as possible increase in size of the engine mount 10 in its central axis direction. Therefore, the engine mount 10 that advantageously affords both active damping action based on oscillatory actuation of the oscillation plate 56 and passive damping action based on resonance of the fluid caused to flow between the pressure-receiving chamber 74 and the equilibrium chamber 80, while making the engine mount 10 compact in size in the axial direction.

While the presently preferred embodiment of this invention has been described in detail for the illustrative purpose only, it is to be understood that the present invention is not limited to the details of the illustrated embodiment. It is also to be understood that the present invention may be embodied with various changes, modifications and improvements which may occur to those skilled in the art, without departing from the spirit and scope of the invention.

For example, while three engaging projections 48 are produced on the partition member 50 in the illustrated embodiment, the number, size, and shape of the engaging projections is not particularly limited. In the illustrated embodiment, "C" shaped punch-out holes 69 surrounding the engaging projections 48 are formed prior to uplifting the engaging projections 48. However, the punch-out holes 69 are not necessarily needed. For instance, it is possible to uplift the engaging projections directly from plate material of flat shape, by means of press machining.

Figure 3:
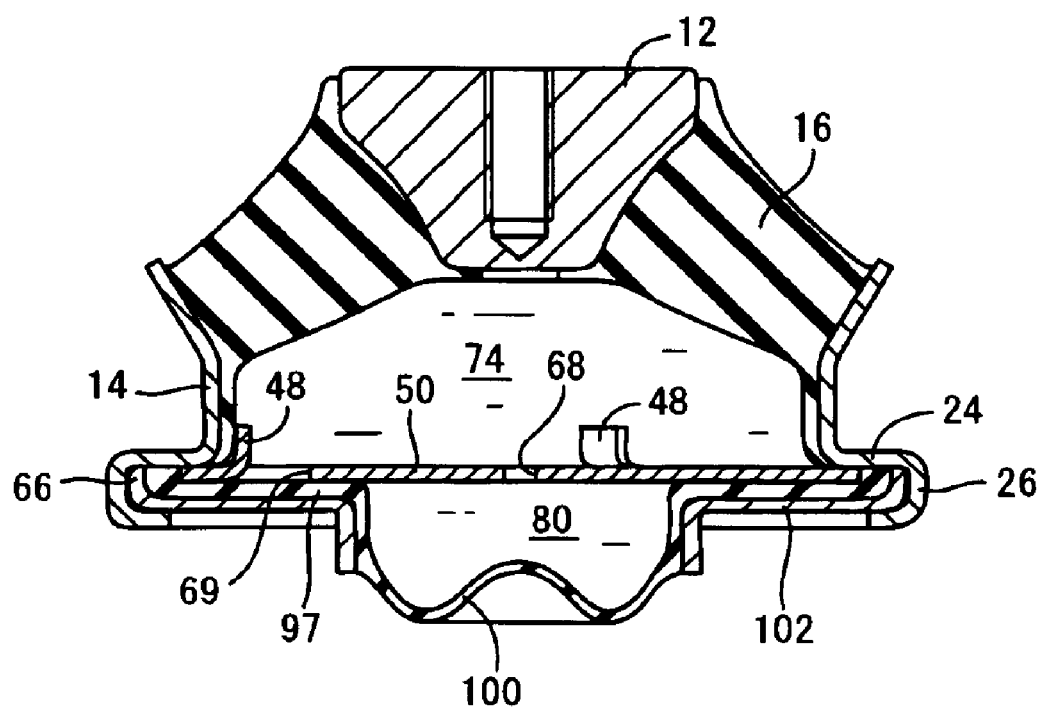
FIG. 3 is an elevational view in axial or vertical cross section of a fluid filled vibration damping device in the form of an automotive vehicle engine mount constructed according to another preferred embodiment of the invention.

In the embodiments hereinabove, the pressure-receiving chamber 74 and the oscillating chamber 76 are formed to either side of the partition member 50. However, as shown in FIG. 3, it would be possible instead to employ as the lid member 52 a fixing member 102 bonded by vulcanization to the outside peripheral portion of a flexible rubber layer 100, thereby forming the pressure-receiving chamber 74 and the equilibrium chamber 80 to either side of the partition member 50. In FIG. 3, the same reference numerals are used to indicate components and sites that generally correspond to these in the preceding embodiment, and redundant explanation for the component is omitted.

When tuning the fluid passage 68 that is formed in the partition member 50, it is possible, for example, to superimpose an orifice forming plate of generally disk shape onto the bottom face of the partition member 50 depicted in FIG. 3, so that the groove formed in the orifice forming plate is covered by the partition member 50, thereby forming an orifice passage that extends in an appropriate configuration with suitable length and cross sectional area between the partition member 50 and the orifice forming plate. The orifice forming plate may be fixed to the partition member by means of welding, or by caulkwise fixing of the outer peripheral portion thereof, together with the fixing member 12 to the second mounting member 14.

Additionally, at the shoulder portion 24 and the cylindrical caulking portion 26 where the elastic body outer sleeve 34 is directly fixed caulkwise with the fixing member 58 and cylindrical bracket 92, a thin rubber sealing layer for ensuring sealing of the non-compressible fluid sealed therein may be deposited on inner circumferential surfaces of the shoulder portion 24 and cylindrical caulking portion 26, provided that adequate fixing strength can be assured through substantial abutment of the metals of these components in the axial direction. The rubber sealing layer may be integrally formed, for example, by extending the diaphragm 30 out along the inner circumferential surface of the second mounting member 14.

While the engine mount for automotive vehicles has been described as one preferred embodiment of the invention, the principle of the present invention may be equally applicable to a body mount, a member mount or other mounts for automotive vehicles, or a variety of vibration damping devices for other than automotive vehicles.

What is claimed is:

1. A fluid filled vibration damping device comprising:
   a first mounting member;
   a second mounting member having a generally hollow cylindrical shape, and situated with a first opening thereof opposed to the first mounting member with an axial spacing therebetween, the second mounting member having a shoulder portion so that a large diameter cylindrical caulking portion is integrally formed at a second opening thereof;
   a rubber elastic body disposed between the first mounting member and the first opening of the second mounting member, and elastically connecting the first and second mounting members to thereby fluid-tightly close the first opening of the second mounting member;
   a lid member having an annular fixing member, and fixed by caulking fixation to the second mounting member with the annular fixing member press fit into the cylindrical caulking portion to be superimposed on the shoulder portion, to thereby fluid-tightly close the second opening of the second mounting member;
   a fluid chamber formed between the rubber elastic body and the lid member, and filled with a non-compressible fluid;
   a partition member installed within the fluid chamber, and having an outside diameter smaller than an inside diameter of the cylindrical caulking portion of the second mounting member;
   a plurality of engaging projections formed onto the partition member by rising up respective portions of an outer peripheral portion of the partition member in uplift cutout form toward one side of the partition member,
   the engaging projections being fit axially inwardly into the second mounting member with the partition member superimposed on the shoulder portion of the second mounting member so that the engaging projections are held in direct or indirect engagement with an inner circumferential surface of the second mounting member, and that the partition member is positioned in an axis-perpendicular direction with respect to the second mounting member; and
   a sealing portion disposed to check a flow of the non-compressible fluid through cutout openings left after the engaging projections have been formed and wherein said cut out openings are formed radially inside of the engaging projections.

2. A fluid filled vibration damping device according to claim 1, wherein a periphery of upraised portion of each of the plurality of engaging projections is press punched over a predetermined width to thereby form a punch-out hole surrounding the each of the plurality of engaging projections.

3. A fluid filled vibration damping device according to claim 2, wherein the sealing portion is formed by extending the fixing member inwardly in a radial direction thereof enough to close cutout openings and punch-out holes in the partition member.

4. A fluid filled vibration damping device according to claim 1, wherein the lid member includes a readily deformable, flexible rubber layer bonded by vulcanization at an outer peripheral portion thereof to the fixing member, and a pressure-receiving chamber partially defined by the rubber elastic body and adapted to give rise to pressure variation during vibration input is formed on one of axially opposite side of the partition member, while an equilibrium chamber partially defined by the flexible rubber layer and readily allowing change in volume is formed on an other of axially opposite side of the partition member, the pressure-receiving chamber and the equilibrium chamber being held in fluid communication with each other through an fluid passage formed by at least partially utilizing the partition member.

5. A fluid filled vibration damping device according to claim 1, wherein the lid member includes an oscillating plate disposed spaced inwardly from the fixing member, and a supporting rubber plate elastically connecting the oscillating plate to the fixing member, the fluid filled vibration damping device further comprising: an actuator for actuating oscillation of the oscillating plate assembled supported by the second mounting member, thereby forming on one of axially opposite sides of the partition member a pressure-receiving chamber partially defined by the rubber elastic body and adapted to give rise to pressure variation during vibration input, while forming on an other side of the axially opposite sides of the partition member an oscillating chamber that is pressure-controlled by means of oscillation of the oscillation plate, the pressure-receiving chamber and the equilibrium chamber being held in fluid communication with each other through a fluid passage formed by at least partially utilizing the partition member.

6. A fluid filled vibration damping device according to claim 1, wherein the sealing portion includes a sealing rubber that is compressed between superimposed faces of the partition member and the fixing member.

7. A fluid filled vibration damping device according to claim 1, wherein an elastic body outer sleeve of generally cylindrical shape is bonded to the outer peripheral portion of the rubber elastic body through vulcanization of the rubber elastic body, the elastic body outer sleeve is fitting within the second mounting member with positioned in the axis-perpendicular direction of the second mounting member, a flange is disposed at a peripheral portion of an opening at a first axial end of the elastic body outer sleeve, and the flange is superimposed on the shoulder portion of the second mounting member and fixed caulkwise at the cylindrical caulking portion so that an outside peripheral portion of the rubber elastic body is fixed to the second mounting member, while the partition member and the fixing member are serially superimposed against the elastic body outer sleeve with the engaging projection of the partition member positioned indirectly against the inner circumferential surface of the second mounting member via the elastic body outer sleeve, and with the outside peripheral portion of the partition member supported held between the fixing member and the flange of the elastic body outer sleeve which are respectively caulked directly at the cylindrical caulking portion of the second mounting member.

8. A fluid filled vibration damping device according to claim 7, wherein the outside diameter of the partition member is smaller than an inside diameter of the shoulder portion of the second mounting member.

* * * * *